July 7, 1970
A. M. DONOFRIO
3,518,725
MACHINE FOR FORMING MULTIPLE CAVITY CONTAINERS FROM
THERMOPLASTIC SHEET MATERIAL
Filed Sept. 13, 1967
5 Sheets-Sheet 1
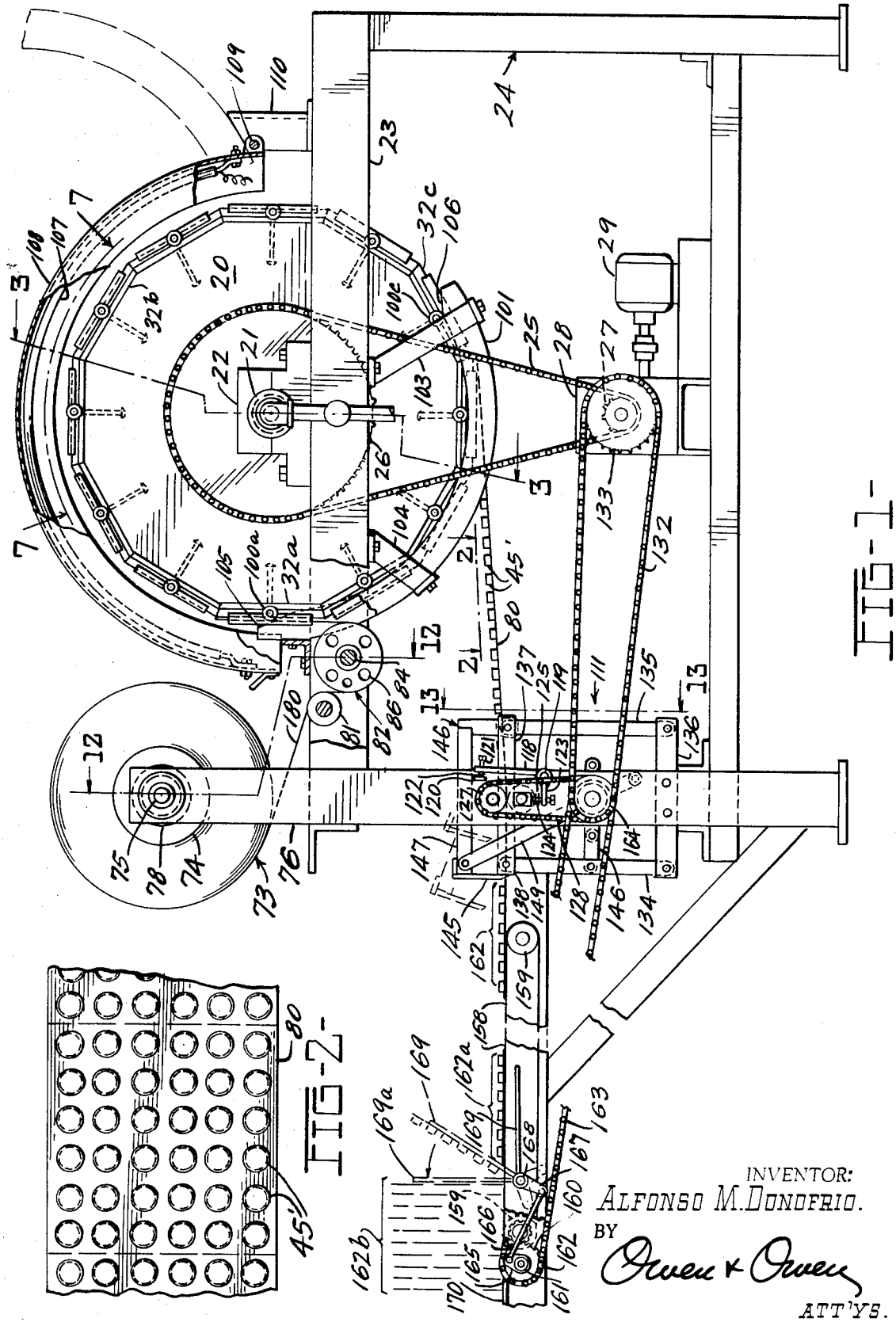
INVENTOR:
ALFONSO M. DONOFRIO.
BY
Owen & Owen
ATT'YS.

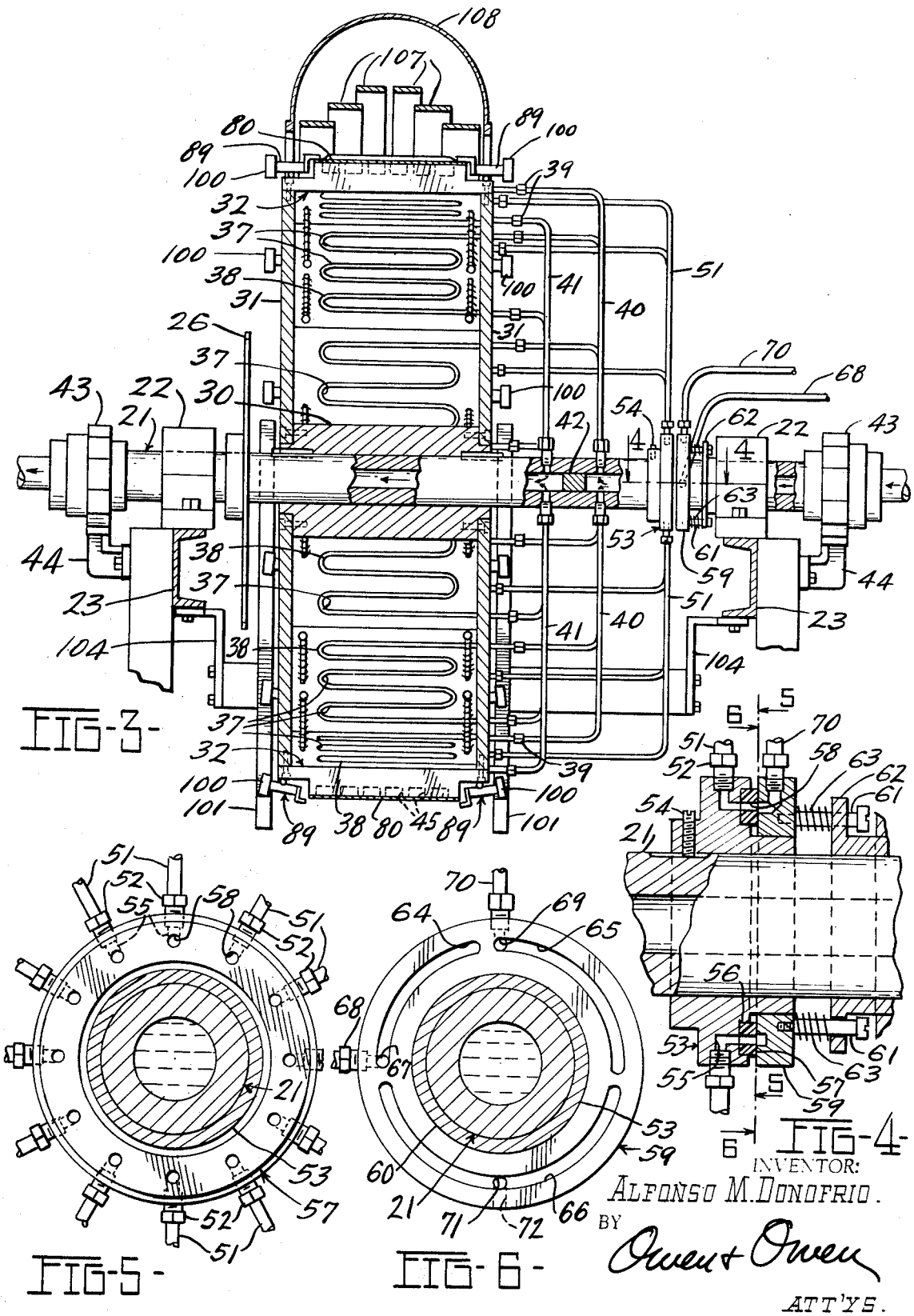

July 7, 1970
A. M. DONOFRIO
3,518,725
MACHINE FOR FORMING MULTIPLE CAVITY CONTAINERS FROM
THERMOPLASTIC SHEET MATERIAL
Filed Sept. 13, 1967
5 Sheets-Sheet 3
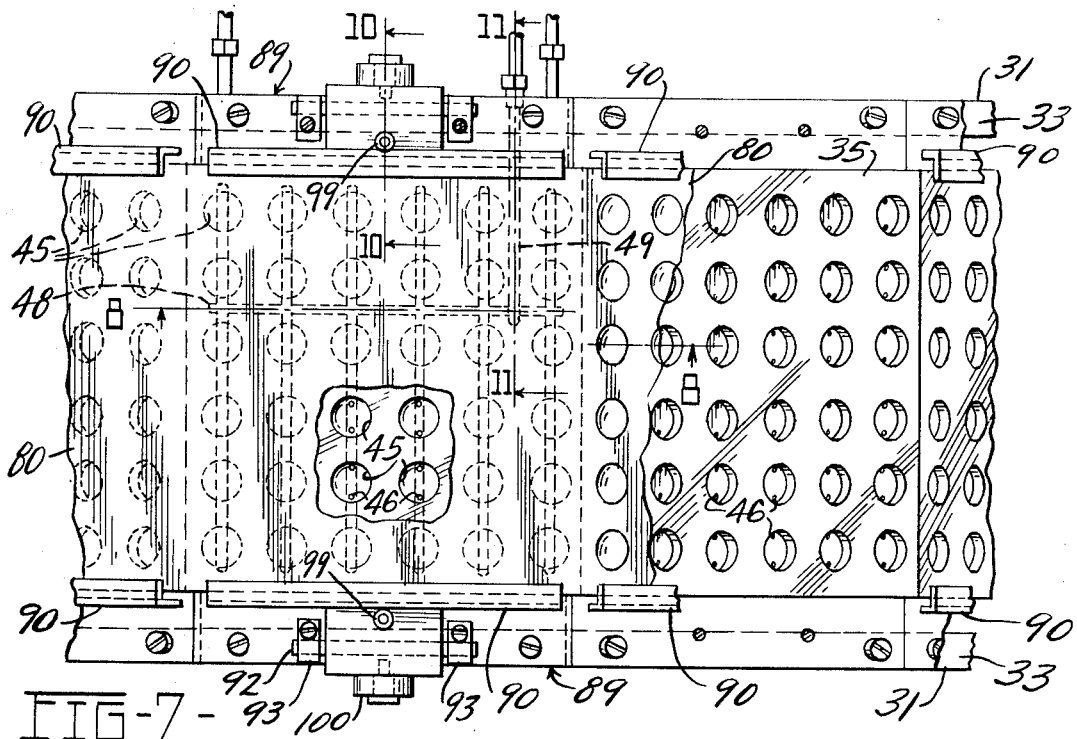
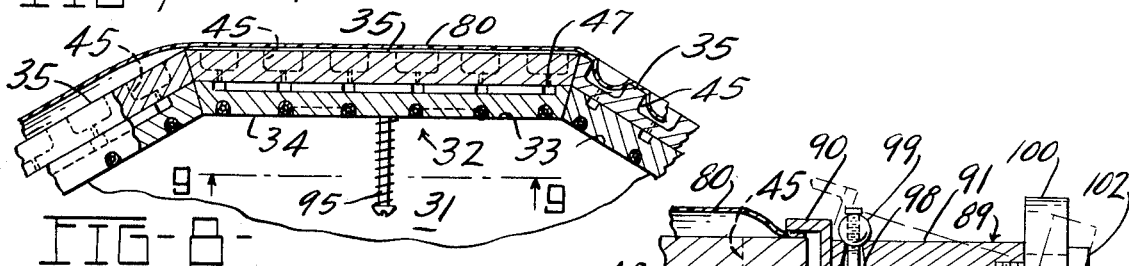
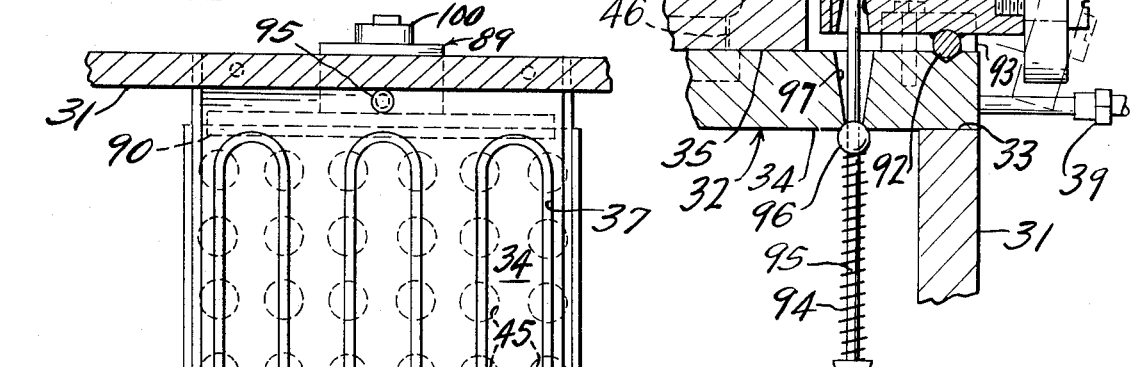
INVENTOR:
ALFONSO M. DONOFRIO.
BY
Owen & Owen
ATT'YS.

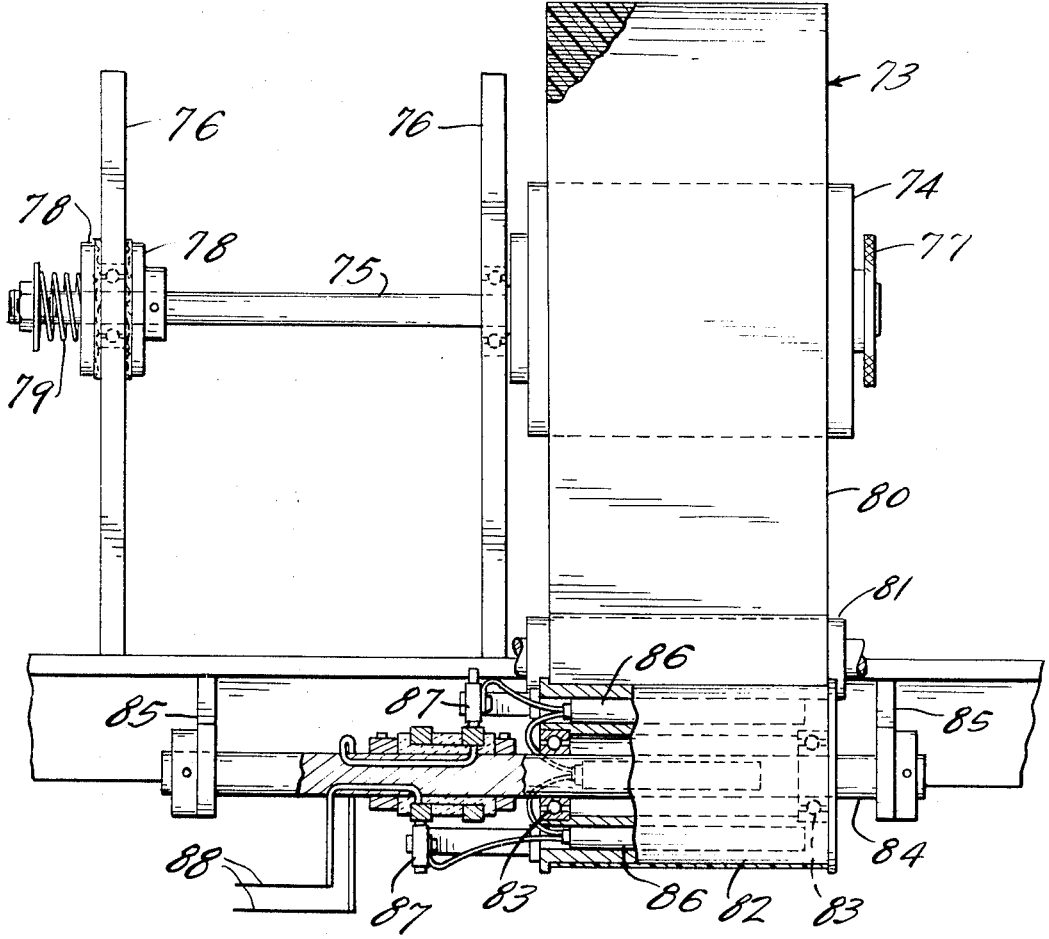
FIG-12-
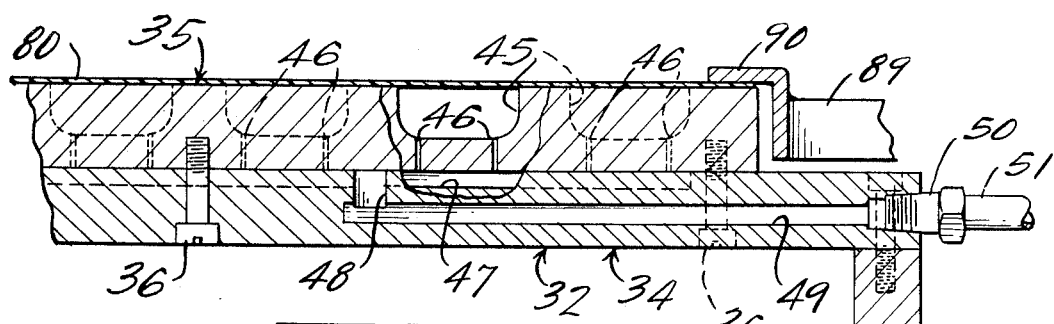
FIG-11-
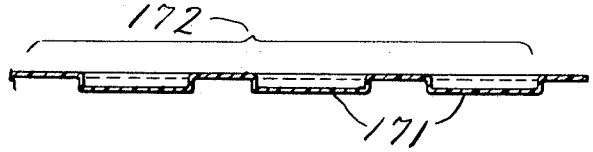
FIG-15-
INVENTOR:
ALFONSO M. DONOFRIO.
BY
Owen & Owen
ATT'YS.

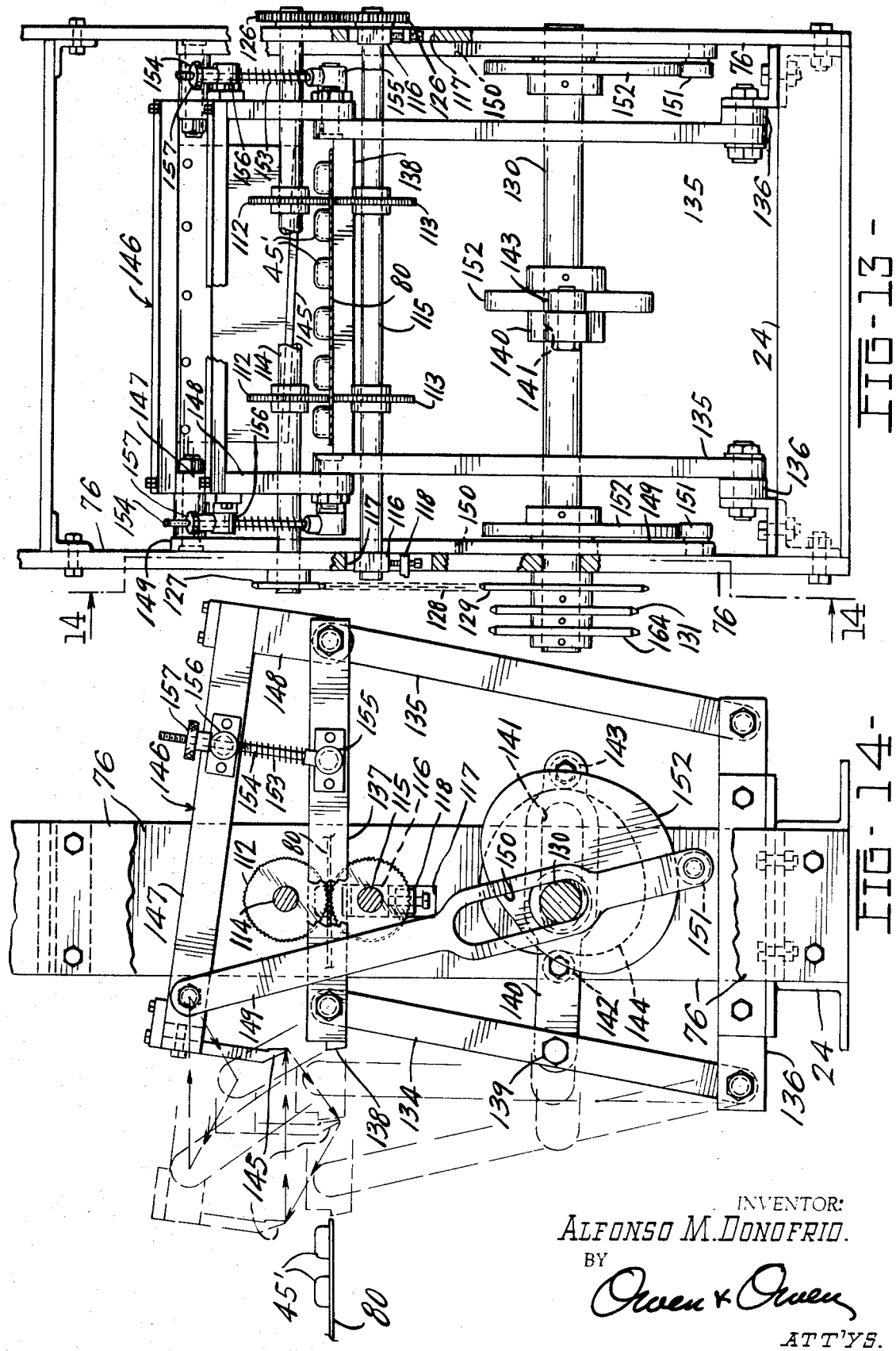

United States Patent Office 3,518,725
Patented July 7, 1970

3,518,725
MACHINE FOR FORMING MULTIPLE CAVITY CONTAINERS FROM THERMOPLASTIC SHEET MATERIAL
Alfonso M. Donofrio, Toledo, Ohio, assignor, by mesne assignments, to Craft Master Corporation, Toledo, Ohio, a corporation of Delaware
Filed Sept. 13, 1967, Ser. No. 667,550
Int. Cl. B29c 3/02
U.S. Cl. 18—21                            1 Claim

ABSTRACT OF THE DISCLOSURE

A machine for forming multiple cavity containers from a continuous web of thermoplastic sheet material. The machine comprises a mounting for a supply roll of the material and a die carrying drum which has a plurality of multiple cavity, pocketed dies mounted in edge to edge adjacency around its periphery. The machine has mechanism for guiding the web of material onto the surfaces of the dies, and each die has clamping means for gripping the margins of the web of material in order to pull it from the supply roll and to maintain its lateral dimension during deformation. Heaters overlie a part of the drum for softening the web of thermoplastic sheet material prior to deformation into the die cavities. Each of the dies is also heated and each has ports and passageways for successively connecting the cavities of the die serially to (1) a compressed air line for holding the sheet off of the die during heating prior to deformation; (2) a vacuum line for deforming the thermoplastic sheet material into the cavities; and (3) a vent line for releasing the pocketed material from the cavities. An off feeding mechanism pulls the pocketed web off of the dies and away from the periphery of the die carrying drum and through an automatic cutter which cuts off a selected length of the pocketed web to form a multiple cavity container having a desired number of pockets therein. Lids for the multiple cavity containers, with similarly oriented depressed portions of a size proper to fit into the open tops of the pockets in the containers for closing the same may also be formed on the machine by utilizing multiple cavity dies having suitable shallower cavities.

---

This invention relates to a machine for forming multiple cavity containers from a continuous web of thermoplastic sheet material and for severing the web at spaced intervals to produce multi-pocketed containers. The machine is also adapted to produce covers or lids for the multi-pocketed containers, the lids having a plurality of shallower pockets, spaced and oriented to be inserted into the open tops of the container pockets after they are filled. The multiple cavity containers and the multi-pocketed covers may be vacuum molded on a machine embodying the invention from identical continuous webs of thermoplastic material, or they may be formed in contrasting materials such as opaque for the containers and transparent for the lids. The number of cavities in the dies, and therefore, the number of pockets in the containers or lids formed thereon, may be any desired number in each row depending only on the width selected and the pocketed web may be cut to any desired length.

The actual multi-cavity containers illustrated in the drawings are utilized for packaging small measured quantities of paint, such as the small quantities of paint packaged in hobby craft paint-by-number sets. If desired, the multiple cavity dies which form the packages and covers may also emboss in the material, suitable numbers to identify the particular colors of paint to be subsequently packaged therein. The machine illustrated has rows of six pockets each in the dies and each die is six rows long.

While the particular embodiment of the invention illustrated in the drawing comprises a drum for carrying a plurality of multiple cavity dies positioned in edge to edge adjacency around its periphery through a circular path, the die carrying member could be so designed as to move the dies through an elliptical path or a closed horizontal path, or a similar closed path. It is necessary only that the dies be sequentially moved to a position where a continuous web of thermoplastic sheet material can be fed into overlying relationship therewith and carried thereby past suitable means for heating the sheet material to a softening temperature, for applying vacuum into the die cavities for drawing the material into the cavities, and for venting the cavities to permit continuous removal of the pocketed sheet material from the cavities. Preferably, temperature maintaining means are provided for the dies, and through suitable manifolding, the die cavities are serially connected to air under pressure for holding the thermoplastic sheet material out of contact with the dies until it is softened, to a vacuum source for pulling the material into the dies, and to a vent for relieving the vacuum behind the pocketed sheets.

It is, therefore, the principal object of the instant invention to provide a continuously operating machine for continuously forming multiple cavity containers from a continuous web of thermoplastic sheet material, for drawing the continuous web of pocketed sheet material from the forming means, and for cutting the pocketed web laterally to separate it into multiple cavity containers or lids.

This principal object and other objects and advantages will be better understood from the specification which follows and from the drawings in which:

FIG. 1 is a side view in elevation of a machine embodying the invention;

FIG. 2 is a fragmentary, horizontal plan view on an enlarged scale, showing a pocketed sheet and indicating where the continuous web might be severed to produce a multiple cavity package having thirty-six pockets arranged in a reticular pattern of six by six;

FIG. 3 is a vertical, sectional view taken along the line 3—3 of FIG. 2;

FIG. 4 is a fragmentary, horizontal sectional view, taken along the line 4—4 of FIG. 3 and shown on an enlarged scale;

FIG. 5 is a framentary, vertical sectional view taken along the line 5—5, looking to the left in FIG. 4;

FIG. 6 is a view similar to FIG. 5 but taken along the line 6—6, looking to the right in FIG. 4;

FIG. 7 is a greatly enlarged, fragmentary view taken from the position indicated by the line 7—7 in FIG. 1 and illustrating steps in the formation of a group of pockets in a continuous web of thermoplastic material as it progresses with its respective die around the periphery of the die carrying drum;

FIG. 8 is a fragmentary, vertical sectional view, taken along the line 8—8 of FIG. 7 and shown on an enlarged scale;

FIG. 9 is a fragmentary, bottom plan view, taken from the position indicated by the line 9—9 of FIG. 8;

FIG. 10 is a fragmentary, vertical sectional view, taken along the line 10—10 of FIG. 7 and shown on an enlarged scale;

FIG. 11 is a fragmentary, vertical sectional view, taken along the line 11—11 of FIG. 7;

FIG. 12 is a fragmentary, vertical sectional view, taken along the line 12—12 of FIG. 1, with parts broken away, and shown on an enlarged scale relative to FIG. 1;

FIG. 13 is a view substantially in elevation taken from the position indicated by the line 13—13 of FIG. 1 and shown on a greatly enlarged scale;

FIG. 14 is a view substantially in elevation with some parts broken away, taken from the position indicated by the line 14—14 of FIG. 13 and diagrammatically illustrating the action of a web cutter; and FIG. 15 is a fragmentary, vertical sectional view, of a cover for a multiple cavity container as shown in FIG. 2, illustrating the shape of a cover which may be formed from a continuous web of thermoplastic sheet material on a machine embodying the invention.

A machine embodying the invention comprises a die carrying means, in this instance a drum, generally indicated by the reference number 20. The drum 20 is mounted on and rotatable with a hollow shaft 21 which is journaled in pillow blocks 22 mounted on side bars 23 of an open frame, generally indicated by the reference number 24. The drum 20 is rotated at a constant speed (clockwise in FIG. 1) by a drive chain 25, meshed with a drive sprocket 26 pinned or otherwise secured on the shaft 21. The chain 25 is also engaged with a smaller sprocket 27 mounted on an output shaft of a gear box 28 driven by a motor 29.

The drum 20 comprises a hub 30 that is keyed or otherwise secured to the shaft 21, a pair of circular side plates 31 and a plurality of multi-cavity dies, each generally indicated by the reference number 32 (see also FIGS. 7–10). The groups of dies 32 forms a periphery for the drum 20, in this instance there being twelve of the dies 32 extending around the periphery of the drum 20 in end to end relationship with each of the individual dies 32 being mounted on flats 33 forming the twelve faceted peripheries of the side plates 31, by suitable machine screws.

Each of the dies 32 consists of a bottom manifold plate 34 (FIGS. 7–10, and 11), and a top pocketed plate 35. The two plates 34 and 35 may be secured to each other after machining by suitably spaced machine screws, such as a machine screw 36 shown in FIG. 11.

Each of the manifold plates 34 is machined on its underside to form a sinuous groove 37 (FIG. 9) for the reception of a correspondingly bent length of tubing 38. The ends of each length of tubing 38 extend laterally beyond the edge of the respective plate 34 and the side plate 31 of the drum 20, and are connected by couplings 39 to a hot water feeding line 40 (FIG. 3), and a hot water return line 41, respectively. The ends of all of the hot water feeding lines 40 are led radially inwardly toward the hollow shaft 21 and connected into radial bores through the wall of the shaft 21, communicating with the hollow interior. A plug 42 stops the bore of the shaft 21 between the position where the water feeding lines 40 are connected thereinto and a spaced position where all of the hot water return lines 41 are similarly connected to the bore of the shaft 21. Hot water at a selected temperature is brought to the end of the hollow shaft 21 (right end in FIG. 3), flows though the bore in the shaft 21 and the hot water feeding lines 40 to the respective ones of the manifold plates 34 and their tubings 38 and then returns through the hot water return lines 41 to the bore of the shaft 21 on the opposite side of the plug 42, passing out of the shaft 21 at its opposite end (left in FIG. 3). The ends of the shaft 21 are connected to hot water source and discharge lines by rotary glands 43 supported by brackets 44 on the frame 24.

Each of the pocketed plates 35 is machined to provide a plurality of individual die pockets 45 into which the thermoplastic sheet material is to be drawn in order to form the individual cavities in the multi-cavity package produced by the machine. In the embodiment of the invention shown in the drawings, there are thirty-six of the individual pockets 45 arranged in a six by six reticulated pattern on equidistant centers and with the centers of the rows of pockets at the leading and trailing edges of an individual die 32 spaced a half center distance from the edge of that die so as to be on the same center to center distance to the adjacent row of pockets 45 in the next one of the dies 32. Vent and pressure holes 46 are drilled downwardly through the pocketed plate 35 from the bottoms of the individual pockets 45, the vent or pressure holes 46 being aligned transversely of the die 32 in rows along the center lines of the pockets 45.

The upper surface of the manifold plate 34 is machined to form passages 47 interconnecting the holes 46 in a transverse row of pockets 45 and the passages 47 are connected to each other by a header passage 48 (FIGS. 7 and 11), also milled in the upper surface of the manifold plate 34. Each of the header passages 48 for an individual die 32 communicates with a feeder passage 49 leading to the lateral edge of the manifold plate 34 and threaded to receive a nipple 50. All of the respective nipples 50 of the dies 32 are coupled to fluid lines 51 and the lines 51 are led radially inwardly toward and connected by nipples 52 around the periphery of a rotating valve collar 53.

The collar 53 is mounted for rotation with the shaft 21 being illustrated (FIGS. 4–6) as secured thereto by a set screw 54 extending through a flange on the collar 53 and into a key way in the surface of the shaft 21. Each of the nipples 52 is threaded into a radially extending end of a right angle passage 55, the inner end of which opens axially of the collar 53 into an annular recess 56 in which there is fixed a sealing ring 57. The sealing ring 57 has twelve apertures 58 which are aligned with the ends of the passages 55 in the collar 53. The sealing ring 57 rotates with the collar 53 and wipes over the flat diametrically extending face of a stationary supply ring 59. The sealing ring 57 may be molded or otherwise fabricated from a suitable plastic substance such as "Teflon," a product of Du Pont. The material must be such that it will withstand the friction created by its rotation on the face of the stationary supply ring 59 and be capable of sealing off the ends of its apertures 58.

The supply ring 59 (see FIG. 6 particularly) rides on a neck 60 of the valve collar 53, being urged into engagement with the sealing ring 57 and held against rotation by a plurality of axially extending bolts 61. The bolts 61 extend through bores in a ring 62 that is secured to the adjacent pillow block 22. Expansion springs 63 surround the bolts 61 between the inner side of the ring 62 and the adjacent side of the supply ring 59, to urge the surface of the supply ring 59 against the surface of the sealing ring 57. Three arcuately extending slots 64, 65 and 66 are milled in the face of the supply ring 59, being cut on the same radius and spaced from the center thereof a radial distance the same as the center lines of the apertures 58 in the sealing ring 57 and, of course, the ends of the right angle passages 55 in the valve collar 53. The slot 64 is an air supply slot and is connected by a bore 67 to an air supply line 68. The arcuate extent of the air supply slot 64 is slightly less than 90° as can best be seen in FIG. 6. The arcuate slot 65 is a vacuum slot and is similarly connected by a bore 69 to a vacuum line 70. The vacuum slot 65 has a circumferential extent of slightly more than 90° as indicated in FIG. 6 and is located around the supply ring 59 beyond the air supply slot 64 in the direction of rotation of the drum 20. The slot 66 is a vent slot and is connected by a bore 71 to a vent opening 72 through the periphery of the supply ring 59. The vent slot 66 has an arcuate extent of somewhat less than 180° and follows the vacuum slot 65 in the direction of rotation of the drum 20.

Thus, as the drum 20 rotates, the fluid lines 51 and the inner passages 47, 48 and 49 are placed sequentially in communication with a supply of air under pressure by the air supply slot 64 then with vacuum line 70 by the vacuum supply slot 65 and then are vented by the vent slot 66.

Referring particularly now to FIGS. 1 and 12, a supply roll 73 of thermoplastic sheet material is mounted upon a hub 74 carried on the outboard end of a rotating shaft 75 journaled by bearings in a pair of uprights 76 erected from one of the cross members of the frame 24. A knurled knob 77 is threaded on the end of the shaft 75 in order to permit removal of the hub 74. The opposite end of the shaft 75 extends through a pair of felt surface collars 78, the inner one of which is pinned to the shaft 75 and the outer one of which is urged against the outer surface of the upright 76 by a spring 79. The collar 78 applies drag to the shaft 75 so that the roll 73 of material will resist unrolling to a slight degree.

A web 80 of the sheet material is led downwardly around an idler roller 81 and the surface of a preheat roll 82. The preheat roll 82 is rotatably mounted by bearings 83 on a shaft 84 extending between depending ears 85 of the frame. The preheat roll 82 has a plurality of internal heating elements 86 which are electrically connected by a suitable brushes 87 to a source of electric current indicated by power lines 88.

The web 80 passes around approximately one-half of the periphery of the preheat roll 82 and then is led upwardly, tangentially into the path of movement of the dies 32 as they rotate on the die carrying drum 20. Tension for pulling the web of material 80 around the preheat roll 82 and off of the sheet supply roll 73 is provided by die clamps 89 (see FIGS. 7 and 10). Each die 32 has two of the clamps 89, one extending along each lateral edge of the particular die 32. Each of the die clamps 89 has a clamping bar 90 which extends along and overlies the edge of the pocketed plate 35 of its respective die 32. The clamping bar 90 is welded or otherwise secured on the inner end of a rocker 91 pivotally carried by a pin 92 mounted in a pair of trunions 93 which are secured on the upper lateral edge of the particular manifold plate 34. Each of the clamps 89 is urged toward clamping position, with its clamping bar 90 overlying the edge of the web 80 and sealing it against the edge surface of the respective pocketed plate 35 by a spring 94. The spring 94 extends between the head of a pin 95 and a swivel ball 96 through which the pin 95 extends. The ball 96 is urged against the underside of the manifold plate 34 and the pin extends through an upwardly flaring conical opening 97 in the manifold plate 34. The pin 95 also extends upwardly through a downwardly flaring conical opening 98 in the rocker 91 and is threaded into a retaining ball 99 positioned in a conical socket at the upper end of the flared opening 98. Thus, expansion of the spring 94 pulls downwardly on the bolt 95 urging the retaining ball 99 against the upper surface of the clamp 89 and the flared conical openings 97 and 98 provide for freedom of movement of the pin 95 as the clamp 89 rocks from its clamping position illustrated in FIG. 10 in solid lines to its open position illustrated in FIG. 10 in broken lines.

Movement of the clamps 89 from the clamping position to the open position is effected by the engagement of clamp actuating rollers 100 with a pair of arcuate cams 101 (FIGS. 1 and 3). Each of the clamps 89 mounts one of the rollers 100 on its outboard end, the roller being freely rotatable on a shouldered machine screw 102. The two arcuate cams 101 are suspended beneath the side bars 23 of the frame 24 by depending brackets 103 and 104 and extend around a lower portion of the periphery of the die carrying drum 20 in line to be engaged by the rollers 100. When the rollers 100 engage the surfaces of the cams 101, the rollers are moved radially inwardly of the drum 20 (downwardly FIG. 10) swiveling the clamps 89 on their pins 92, compressing the springs 94 on the pins 95 and lifting the clamping bars 90 away from clamping position, to release the edges of the web 80.

The web 80 is led from the preheat roll 82 (FIG. 1) upwardly and into engagement with the surface of that one of the dies indicated by the reference number 32a which has just passed the location of the preheat roll 82. As the drum 20 rotates the particular clamp rollers 100 indicated by the reference number 100a then ride down return surfaces 105 of the cams 101 allowing the springs 95 to expand and the clamps 89 to swing their bars 90 downwardly to grip the margins of the web 80. The clamps 89 continue to grip the edges of the web 80 during the following movement of the dies 32 on the drum 20 for approximately 230° of rotation of movement in the embodiment shown until the rollers 100a engage inclined surfaces 106 at the lower ends of the cams 101 and ride up on the cams 101.

In addition to the heat applied to the web 80 by the preheat roller 82, heat is also applied to the web 80 of the thermoplastic material by a number of arcuate heating elements 107 (FIGS. 1 and 3) which are supported in the interior of a semicircular hood 108. The heating elements 107 may be the "Calrod" type or other radiant heaters and they extend around the periphery of the die carrying drum 20 a distance so as to apply heat to the web of thermoplastic material while it is being prepared for forming and during the forming of the web 80 into the pockets 45 in the pocketed plate 35. The hood 108 is mounted by pivot pins 109 in support posts 110 carried by the frame 24.

As has earlier been indicated with reference to FIGS. 5 and 6, particularly, immediately after engagement of the web of material 80 with the first die 32a which passes the preheat roller 82, the clamps 89 are closed and the respective apertures 58 in the sealing ring 57 communicate with the arcuate air slot 64 in the supply ring 59. Air under slight pressure is fed through the fluid line 51 to this particular die 32a and lifts the portion of the web 80 out of contact with the flat upper surface of the pocketed plate 36 (see FIG. 10). This condition continues for approximately 90° of rotational movement as determined by the arcuate extend of the air supply slot 64. During this 90° rotational movement, the web 80 is heated by the arcuate heaters 107 and the extend of movement and the speed of rotation of the drum 20 are such that the thermoplastic sheet material in the web 80 is softened to a point proper for deformation.

Immediately thereafter, at approximately the uppermost position of the particular die 32b (in FIG. 1) in its path of movement around with the drum 20, its respective aperture 58 and fluid line 51 are placed in communication with the vacuum slot 65 and a vacuum of sufficient negative pressure is applied through the line 51 and the passages in the particular die 32b to deform the web of material 80 downwardly into the pockets 45. Because of the approximate 90° extent of the vacuum slot 65, negative pressure continues to be applied beneath the web of material 80 engaged with the particular die 32b and heat continues to be applied thereto during the approximate 90° of rotation from the uppermost position to the end of the vacuum slot 65 and the heaters 107.

During continued rotational movement of the particular die 32 beyond the end of the vacuum slot 65 and the heaters 107, the line 51 and the passages interiorly of the die 32 are placed in communication with the vent slot 66 to relieve the negative pressure beneath the depressions now formed in the web 80 in the pockets 45. Shortly thereafter, the clamp actuating rollers 100c of the particular die 32c (FIG. 1) engage the release surfaces 106 of the cams 101 and the clamps 89 are opened to release their grasp of the edges of the now pocketed web 80 of thermoplastic material.

The pocketed web 80 is then led to a web guiding and cutting mechanism generally indicated by the reference number 111 in FIG. 1 and shown in detail in FIGS. 13 and 14.

The web 80 passes between opposed pairs of knurled feeding rollers 112 and 113 (FIG. 13). The upper feeding rollers 112 are pinned on a shaft 114 which is journaled in and extends horizontally between the lower portions of the uprights 76. The two lower feeding rollers 113 are similarly mounted on a shaft 115 extending horizontally parallel to the shaft 114. The shaft 115 is journaled in squared bearing blocks 116 that are positioned in vertical rectangular slots 117 in the uprights 76. The bearing blocks 116 are pressed vertically in their respective slots 117 by a pair of spring urged bell cranks 118

(FIG. 1) that are pivotally mounted by pins 119 on the outboard sides of the uprights 76. A stationary cross bar 120 extending between the uprights 76 mounts a pair of guide studs 121 around each of which is positioned a spring 122 which tends to urge the respective one of the bell cranks 118 in a clockwise direction (FIG. 1). Lower arms 123 of the bell cranks 118 are similarly guided by studs 124 which are threaded into the bearing blocks 116 and simliarly equipped with springs 125 acting to urge the bearing blocks 116 upwardly relative to the arms 123. The springs 122 and 125 act in concert to apply upward pressure against the bearing blocks 116 which causes the lower knurled feeding rollers 113 to press the web 80 against the upper roller 112 in order to grip the pocketed web 80 and pull it out of and away from the dies 32, and feed it through the mechanism 111.

As can best be seen in FIG. 13, the pairs of opposed feeding rollers 112, 113 are vertically aligned to run between adjacent ones of the cavities 45'. The two shafts 114 and 115 are geared together for rotation in opposite directions by a pair of gears 126 pinned on their outboard ends. A sprocket 127 on the end of the upper shaft 114 opposite the gears 126 is engaged by a chain 128 driven by a larger sprocket 129 that is pinned on the end of a cam shaft 130. The cam shaft 130 has a second sprocket 131 engaged by a main drive chain 132 (see also FIG. 1) powered by a sprocket 133 on the output shaft of the gear box 28. The feeding rollers 112 and 113 rotate at a constant linear speed synchronized by the drive chains 128 and 132 to the speed of rotation of the die carrying drum 20.

The mechanism 111 also includes a flying shear driven from the cam shaft 130 for cross cutting the web 80 to provide multi-cavity containers having a selected number of transverse rows of the cavities 45'. In the embodiment of the invention illustrated in the drawings, the mechanism is so designed as to cross cut the web 80 after each six rows of cavities 45', to provide a multiple cavity container having thirty-six individual cavities 45' (see FIG. 2).

The flying shear portion of the mechanism 111 includes two pairs of generally vertically extending, parallel links 134 and 135 (FIG. 14). The two links 134 and the two links 135 are pivotally mounted, respectively, at the front and rear ends of a pair of cross bars 136 which are rigidly secured to the uprights 76. Each of the sets of links 134, 135 is connected at its upper ends by a generally horizontal travelling bar 137 located at a level approximately the same as the pocketed web 80 to be cut. A shear bar 138 is welded or otherwise rigidly secured to the ends of the travelling bars 137, extending across between them at a level beneath the level of the pocketed web 80 and forming one member of a vertically operating flying shear.

A cross rod 139 extends horizontally between the two front parallel links 134 and pivotally mounts a horizontal driving arm 140. The driving arm 140 has a widened portion providing a slot 141 embracing the cam shaft 130 and providing for generally horizontal movement of the arm 140 relative to the cam shaft 130. The horizontal arm 140 also mounts a pair of cam rollers 142 and 143 positioned in embracing relationship to a generally heart-shaped cam 144 that is pinned by its collar onto the cam shaft 130 for rotation therewith. The profile of the cam 144 is such that the transverse distance between its surfaces, i.e., the distance between the inner surfaces of the cam rollers 142 and 143 is constant so that these two rollers 142 and 143 can maintain their grasp on the cam 144 to provide for both positive forward and return movement of the driving arm 140 and thus positive rocking movement of the pairs of parallel links 134 and 135.

A draw knife 145 extends across above the pocketed web 80 being mounted on the forward end of a rocker 146 comprising two generally horizontally extending arms 147 and rigidly connected struts 148. The rocker 146 is pivotally mounted by the struts 148 on the same pivotal center line as the connection between the rear parallel links 135 and the travelling bar 137. The rocker 146 is actuated by a pair of pull down arms 149 which are pivotally connected at their upper ends near the fronts of the arms 147 and which have enlargements providing elongated slots 150 which embrace the cam shaft 130. Each of the pull down arms 149, carries a cam roller 151 at its lower end and the cam rollers 151 ride the peripheries of identically configured vertical actuation cams 152 which are pinned by their collars on the cam shaft 130.

The rocker 146 is returned to its upper position (solid lines in FIG. 14) and the cam roller 151 maintained in engagement with its cam 152 by a pair of lifting springs 153 which extend around pins 154. Each of the pins 154 extends through a swivel block 155 positioned on the outer side of its respective travelling bar 137 and through a similar swivel block 156 located on the outer side of the respective one of the arms 147. Kurled adjusting nuts 157 are threaded on the upper ends of the pins 154 to limit the stroke of the rocker 146.

Referring now particularly to FIG. 14, the rest position of the knife 145 is shown in solid lines with its edge indicated at position (1). Positions Nos. (2) and (3) are indicated in broken lines. When the cam shaft 130 is rotated, the parallel links 134 and 135 and the cam 152 move the shear bar 138 downwardly and forwardly with the pocketed web 80, indicated by the arrows leading from position (1) to position (2) in FIG. 14. Engagement of the knife 145 and shear bar 138 cuts the web 80 while the shear mechanism is travelling with the web and at the same speed as the web. Immediately thereafter, the parallel links 134, 135 and the cams 144 and 152 result in an angularly upward travel of the knife 145 as indicated by the arrows leading from position (2) to position (3). Thereafter, under the influence of the cams 144 and 152 and the springs 153, the rocker 146 traverses the path between the positions indicated by the numbers (3) and (1) in FIG. 14.

The timing of the mechanism 111 relative to the other mechanisms of the machine is such that a package consisting of six rows of cavities 45', six in each row, or a total of thirty-six cavities 45', is cut off of the leading edge of the pocketed web 80 after the package to be severed has passed the cutting line of the knife 145 and shear 138. Thus, the package being severed has already been advanced onto a pair of laterally spaced narrow off-feeding belts 158 (FIG. 1) which are carried by pairs of rollers 159 and driven by spur gears 160, one of which is pinned on the shaft for one pair of the rollers 159 and the other of which is pinned on a parallel shaft 161 which also carries a sprocket 162 that is driven by a chain 163 engaged with a sprocket 164 on the cam shaft 130.

The belts 158 are driven at twice the lineal speed of the knurled feeding rollers 112, 113, so that space opens between a thirty-six cavity package indicated by the reference number 162 which has just been cut by the mechanism 111 in the position shown in FIG. 1, and a preceding thirty-six cavity package 162a which was previously cut by the mechanism 111.

A crank 165 on the shaft 161 is connected by a link 166 to an arm 167 which is pinned or otherwise secured on the end of a shaft 168 extending across beneath the feeding belts 158 and carrying a paddle 169. The paddle 169 is of such width as to swing upwardly between the spans of the belts 158. Thus, as the shaft 161 rotates, rotating its crank 165, the arm 167 is oscillated through a 90° arc intermittently sweeping the paddle 169 upwardly to the position indicated by the reference number 169a to erect each of the individual packages into a group of packages, indicated by the reference number 162b in FIG. 1. If desired, an off-carrying belt 170 may be provided to carry away the erected group of packages 162b.

FIG. 15 shows a fragmentary side view of a group of lids 171 in a multiple cavity unit 172. Each of the individual lids 171 is of a size to snap in the top of an individual cavity 45' and the lid unit 172 is of the same size and orientation as one of the multiple cavity package 162 which it is to cover. The units 172 of thirty-six lids each may be continuously formed on a machine embodying the invention using dies 32 with pockets 45 of smaller size and, of course, much lesser depth than those illustrated for forming the package cavities 45'.

Having described my invention, I claim:

1. In a machine for forming multiple cavity container units from thermoplastic sheet material each of such containers having a group of cavities of predetermined number and orientation and a planar web and margin extending between such cavities and laterally around each group thereof, said machine comprising a plurality of multi-pocket dies, each of said dies corresponding to one container unit, means for moving said dies in longitudinal edge-to-edge relationship through a closed path and beneath heating means, means for guiding and feeding a continuous sheet of thermoplastic material into said path and into overlying relationship to and for movement with said dies, the width of said sheet being substantially equal to the width of said dies, a vacuum source and valving and manifolding for applying such vacuum to said dies for deforming said sheet into said die pockets, the improvement consisting of, a planar surface on each of said dies extending between and marginally around the group of cavities in said die, a pair of edge clamps mounted at opposite sides of each of said dies and having a planar clamping surface extending longitudinally along the lateral margins of said die, a spring biased for closing said clamps for gripping the lateral edges of said sheet at least during vacuum deformation of said sheet into said die cavities, a cam track adjacent each side of the path of movement of said dies and extending from just prior to the point of departure of said sheet therefrom to just beyond the point of entry of said sheet thereinto and a cam engager carried by each of said clamps, said cam being so shaped as to open and hold open each of said pairs of clamps against said springs during engagement of said cam engagers therewith.

References Cited

UNITED STATES PATENTS

| | | | |
|---|---|---|---|
| 2,590,379 | 3/1952 | Cloud | 18—21 XR |
| 2,641,797 | 6/1953 | Waltman | 18—21 XR |
| 2,799,048 | 7/1957 | Stirn et al. | 18—21 |
| 3,026,566 | 3/1962 | Martelli et al. | 18—21 XR |
| 3,181,202 | 5/1965 | Martelli et al. | 18—21 XR |
| 3,226,458 | 12/1965 | Graff et al. | 18—21 XR |
| 3,314,110 | 4/1967 | Missbach | 18—21 XR |

WILBUR L. McBAY, Primary Examiner

U.S. Cl. X.R.

18—6